United States Patent
Thorson et al.

(10) Patent No.: US 9,491,706 B2
(45) Date of Patent: Nov. 8, 2016

(54) REDUCED-POWER TRANSMITTING FROM A COMMUNICATIONS DEVICE

(71) Applicant: GOOGLE TECHNOLOGY HOLDINGS LLC, Mountain View, CA (US)

(72) Inventors: Dean E. Thorson, Grayslake, IL (US);
Steve R. Hauswirth, Gurnee, IL (US);
Eric L. Krenz, Crystal Lake, IL (US);
Paul J. Moller, Lake Zurich, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 166 days.

(21) Appl. No.: 13/798,682

(22) Filed: Mar. 13, 2013

(65) Prior Publication Data
US 2014/0274188 A1 Sep. 18, 2014

(51) Int. Cl.
*H04W 52/04* (2009.01)
*H04W 52/36* (2009.01)
*H04W 52/38* (2009.01)

(52) U.S. Cl.
CPC ........... *H04W 52/04* (2013.01); *H04W 52/367* (2013.01); *H04W 52/38* (2013.01); *Y02B 60/50* (2013.01)

(58) Field of Classification Search
CPC .......................... H04W 52/04; H04B 1/3838
USPC ............................................. 455/127.1, 522
See application file for complete search history.

(56) References Cited

U.S. PATENT DOCUMENTS

| 2,499,663 A | 3/1950 | Medlar |
| 2,529,038 A | 11/1950 | Medlar et al. |
| 2,563,234 A | 8/1951 | Godshalk et al. |
| 2,627,060 A | 1/1953 | Berg |

(Continued)

FOREIGN PATENT DOCUMENTS

| DE | 10118189 | 11/2002 |
| EP | 1298809 | 4/2003 |

(Continued)

OTHER PUBLICATIONS

Patent Cooperation Treaty, International Search Report and Written Opinion of the International Searching Authority for International Application No. PCT/US2014/014994, Mar. 21, 2014, 12 pages.

(Continued)

*Primary Examiner* — Edward Urban
*Assistant Examiner* — Ralph H Justus
(74) *Attorney, Agent, or Firm* — Wolfe-SBMC (57) ABSTRACT

Aspects of the present disclosure teach decreasing, in a time-averaged regime, the amount of RF energy emitted by a communications device. Generally speaking, the network tells the communications device what power level it should transmit at. If, however, the device determines that it would exceed an emission standard by transmitting at the specified power level for as long as it needs to in order to carry out its transmission duties, then the device can instead decide to transmit at a lower power level. Alternatively (or in combination), the device can, instead of transmitting all the time while it has data to send, only transmit intermittently. In either case, the emitted electromagnetic energy, as averaged over a period of time, is reduced below the maximum allowed by the standard. Later, if possible and necessary, the device can again transmit at a higher power level or more frequently.

20 Claims, 6 Drawing Sheets

(56) References Cited

U.S. PATENT DOCUMENTS

| | | | |
|---|---|---|---|
| 2,637,836 A | 5/1953 | Kendall et al. | |
| 3,678,363 A | 7/1972 | Ringle | |
| 4,061,956 A | 12/1977 | Brown et al. | |
| 4,082,097 A | 4/1978 | Mann et al. | |
| 4,629,965 A | 12/1986 | Fallon et al. | |
| 4,649,333 A | 3/1987 | Moore | |
| 4,692,682 A | 9/1987 | Lane et al. | |
| 4,712,055 A | 12/1987 | Houser, Jr. | |
| 4,727,306 A | 2/1988 | Misak et al. | |
| 4,745,349 A | 5/1988 | Palanisamy et al. | |
| 5,012,176 A | 4/1991 | LaForge | |
| 5,136,231 A | 8/1992 | Faulk | |
| 5,166,596 A | 11/1992 | Goedken | |
| 5,172,044 A | 12/1992 | Sasaki et al. | |
| 5,179,335 A | 1/1993 | Nor | |
| 5,185,566 A | 2/1993 | Goedken et al. | |
| 5,363,031 A | 11/1994 | Miller et al. | |
| 5,481,175 A | 1/1996 | Qualich et al. | |
| 5,504,416 A | 4/1996 | Holloway et al. | |
| 5,523,667 A | 6/1996 | Feldstein | |
| 5,600,230 A | 2/1997 | Dunstan | |
| 5,640,059 A | 6/1997 | Kammiller et al. | |
| 5,656,920 A | 8/1997 | Cherng et al. | |
| 5,731,694 A | 3/1998 | Wilcox et al. | |
| 5,736,834 A | 4/1998 | Kuno | |
| 5,804,944 A | 9/1998 | Alberkrack et al. | |
| 5,815,389 A | 9/1998 | Plow et al. | |
| 5,900,718 A | 5/1999 | Tsenter | |
| 6,094,033 A | 7/2000 | Ding et al. | |
| 6,144,186 A | 11/2000 | Thandiwe et al. | |
| 6,236,189 B1 | 5/2001 | Franke | |
| 6,275,006 B1 | 8/2001 | Koike et al. | |
| 6,298,233 B1 | 10/2001 | Souissi et al. | |
| 6,330,455 B1 | 12/2001 | Ichihara | |
| 6,470,003 B1 * | 10/2002 | Smith | H04B 7/2656 370/235 |
| 6,495,992 B1 | 12/2002 | Pavlovic | |
| 6,639,462 B1 | 10/2003 | Luu | |
| 6,771,051 B2 | 8/2004 | Oglesbee et al. | |
| 6,803,746 B2 | 10/2004 | Aker et al. | |
| 6,850,040 B2 | 2/2005 | Xiong et al. | |
| 6,917,182 B2 | 7/2005 | Burton et al. | |
| 6,927,555 B2 | 8/2005 | Johnson | |
| 7,146,139 B2 | 12/2006 | Nevermann | |
| 7,151,411 B2 | 12/2006 | Martin et al. | |
| 7,158,804 B2 | 1/2007 | Kumaran et al. | |
| 7,170,341 B2 | 1/2007 | Conrad et al. | |
| 7,301,308 B2 | 11/2007 | Aker et al. | |
| 7,549,177 B2 | 6/2009 | Diefenbaugh et al. | |
| 7,724,194 B2 | 5/2010 | Black et al. | |
| 8,013,674 B2 | 9/2011 | Drogi et al. | |
| 8,054,039 B2 | 11/2011 | Bauerle et al. | |
| 8,155,081 B1 | 4/2012 | Mater et al. | |
| 8,204,446 B2 | 6/2012 | Scheer et al. | |
| 8,232,685 B2 | 7/2012 | Perper et al. | |
| 8,269,467 B2 | 9/2012 | Li et al. | |
| 8,278,871 B2 | 10/2012 | Kallmyer | |
| 8,288,994 B2 | 10/2012 | Jakes et al. | |
| 8,427,011 B2 | 4/2013 | Jung et al. | |
| 8,436,492 B2 | 5/2013 | Jung et al. | |
| 8,538,428 B2 | 9/2013 | Bartlett et al. | |
| 8,552,593 B2 | 10/2013 | Jung et al. | |
| 8,552,693 B2 | 10/2013 | Paryani | |
| 8,592,065 B2 | 11/2013 | Bhardwaj et al. | |
| 8,624,546 B2 | 1/2014 | Jung et al. | |
| 8,643,342 B2 | 2/2014 | Mehta et al. | |
| 8,754,614 B2 | 6/2014 | Paryani et al. | |
| 8,760,010 B2 | 6/2014 | Jung et al. | |
| 8,805,764 B1 | 8/2014 | Rhines et al. | |
| 9,246,454 B2 | 1/2016 | Schirmann et al. | |
| 9,356,461 B2 | 5/2016 | Howard et al. | |
| 9,419,457 B2 | 8/2016 | Robinson et al. | |
| 9,438,293 B2 | 9/2016 | Slater et al. | |
| 2001/0017602 A1 | 8/2001 | Hieb | |
| 2003/0085684 A1 | 5/2003 | Tsukamoto et al. | |
| 2003/0189417 A1 | 10/2003 | Dias et al. | |
| 2003/0228875 A1 * | 12/2003 | Alapuranen | H04W 52/225 455/522 |
| 2003/0228891 A1 | 12/2003 | Kobayashi et al. | |
| 2004/0075494 A1 | 4/2004 | Klomsdorf et al. | |
| 2004/0117330 A1 | 6/2004 | Ehlers et al. | |
| 2004/0176125 A1 * | 9/2004 | Lee | H04B 1/3838 455/522 |
| 2004/0222769 A1 | 11/2004 | Al-Anbuky et al. | |
| 2004/0257040 A1 | 12/2004 | Xiong et al. | |
| 2005/0017677 A1 | 1/2005 | Burton et al. | |
| 2005/0030094 A1 | 2/2005 | Conrad et al. | |
| 2005/0046387 A1 | 3/2005 | Aker et al. | |
| 2005/0168193 A1 | 8/2005 | Xiong et al. | |
| 2005/0253561 A1 | 11/2005 | Tibbs | |
| 2006/0028176 A1 | 2/2006 | Tang et al. | |
| 2006/0158156 A1 | 7/2006 | Gamboa | |
| 2006/0269835 A1 | 11/2006 | Song | |
| 2007/0069735 A1 | 3/2007 | Graf et al. | |
| 2007/0188139 A1 | 8/2007 | Hussain et al. | |
| 2008/0074084 A1 | 3/2008 | Lee et al. | |
| 2008/0154624 A1 | 6/2008 | O'Neil | |
| 2008/0197711 A1 | 8/2008 | Kato et al. | |
| 2008/0211455 A1 | 9/2008 | Park et al. | |
| 2008/0303480 A1 | 12/2008 | Prutchi et al. | |
| 2009/0102294 A1 | 4/2009 | Hodges et al. | |
| 2009/0131074 A1 | 5/2009 | Minier | |
| 2009/0206797 A1 | 8/2009 | Chueh et al. | |
| 2009/0295226 A1 | 12/2009 | Hodges et al. | |
| 2010/0033138 A1 | 2/2010 | Alger et al. | |
| 2010/0085010 A1 | 4/2010 | Suzuki et al. | |
| 2010/0127666 A1 | 5/2010 | Ball | |
| 2010/0127889 A1 | 5/2010 | Vogel et al. | |
| 2010/0156355 A1 | 6/2010 | Bauerle et al. | |
| 2010/0198423 A1 | 8/2010 | Hirst | |
| 2010/0198713 A1 | 8/2010 | Forbes et al. | |
| 2010/0225272 A1 | 9/2010 | Kirby et al. | |
| 2010/0233989 A1 | 9/2010 | Constien et al. | |
| 2010/0266066 A1 | 10/2010 | Takahashi | |
| 2010/0283691 A1 | 11/2010 | Su et al. | |
| 2011/0012562 A1 | 1/2011 | Paryani | |
| 2011/0018346 A1 | 1/2011 | Dixon | |
| 2011/0037439 A1 | 2/2011 | Bhardwaj et al. | |
| 2011/0070848 A1 | 3/2011 | Reddy | |
| 2011/0071597 A1 | 3/2011 | Aghassian | |
| 2011/0090126 A1 | 4/2011 | Szini et al. | |
| 2011/0119005 A1 | 5/2011 | Majima et al. | |
| 2011/0121836 A1 | 5/2011 | Kim et al. | |
| 2011/0140538 A1 | 6/2011 | Jung et al. | |
| 2011/0151942 A1 | 6/2011 | Hanley et al. | |
| 2011/0156661 A1 | 6/2011 | Mehta et al. | |
| 2011/0222469 A1 * | 9/2011 | Ali | H04L 1/0003 370/328 |
| 2011/0275369 A1 | 11/2011 | Bartlett et al. | |
| 2011/0291619 A1 | 12/2011 | Asakura | |
| 2011/0316475 A1 | 12/2011 | Jung et al. | |
| 2012/0021800 A1 * | 1/2012 | Wilson | H04W 52/146 455/550.1 |
| 2012/0032646 A1 | 2/2012 | Lee | |
| 2012/0071195 A1 * | 3/2012 | Chakraborty | H04B 1/3838 455/522 |
| 2012/0146576 A1 | 6/2012 | Partovi | |
| 2012/0147801 A1 * | 6/2012 | Ho | H04W 52/365 370/311 |
| 2012/0210325 A1 | 8/2012 | de Lind van Wijngaarden et al. | |
| 2012/0213172 A1 * | 8/2012 | Kim | H04W 52/146 370/329 |
| 2012/0235636 A1 | 9/2012 | Partovi | |
| 2012/0242906 A1 | 9/2012 | Shintani et al. | |
| 2013/0020862 A1 | 1/2013 | Miller | |
| 2013/0069658 A1 | 3/2013 | Rich et al. | |
| 2013/0121194 A1 | 5/2013 | Heshmati | |
| 2013/0122827 A1 | 5/2013 | Ali et al. | |
| 2013/0169348 A1 * | 7/2013 | Shi | H04B 1/3838 327/517 |
| 2013/0237254 A1 | 9/2013 | Papakipos et al. | |
| 2013/0249479 A1 | 9/2013 | Partovi | |
| 2013/0255359 A1 | 10/2013 | Sakai et al. | |
| 2014/0068288 A1 | 3/2014 | Robinson et al. | |

(56) References Cited

U.S. PATENT DOCUMENTS

| | | | |
|---|---|---|---|
| 2014/0070761 | A1 | 3/2014 | Labbe et al. |
| 2014/0070762 | A1 | 3/2014 | Jenwatanavet et al. |
| 2014/0084856 | A1 | 3/2014 | Howard et al. |
| 2014/0092243 | A1 | 4/2014 | Ichikawa |
| 2014/0097671 | A1 | 4/2014 | Nakamura et al. |
| 2014/0176067 | A1 | 6/2014 | Suzuki et al. |
| 2014/0232330 | A1 | 8/2014 | Robertson et al. |
| 2014/0253023 | A1 | 9/2014 | Paryani |
| 2014/0266462 | A1 | 9/2014 | Schirmann et al. |
| 2015/0064528 | A1 | 3/2015 | Liu et al. |
| 2015/0234054 | A1 | 8/2015 | Lennen et al. |
| 2015/0349372 | A1 | 12/2015 | Maleki et al. |
| 2015/0379533 | A1 | 12/2015 | Alberth et al. |
| 2016/0043752 | A1 | 2/2016 | Slater et al. |
| 2016/0072326 | A1 | 3/2016 | Nilles |

FOREIGN PATENT DOCUMENTS

| | | |
|---|---|---|
| EP | 1505725 | 7/2009 |
| EP | 2077682 | 7/2009 |
| EP | 2222371 | 5/2011 |
| EP | 2595269 | 5/2013 |
| JP | H09247852 | 9/1997 |
| JP | 2003333200 | 11/2003 |
| WO | WO-9306682 | 4/1993 |
| WO | WO-2011084367 | 7/2011 |
| WO | WO-2011090769 | 7/2011 |
| WO | WO-2013152149 | 10/2013 |

OTHER PUBLICATIONS

"International Preliminary Report on Patentability", Application No. PCT/US2014/014994, Sep. 15, 2015, 8 pages.
"3GTPP TS 36.213 V9.3.0 3rd Generation Partnership Project Technical Specification Group Radio Access Network", Evolved Universal Terrestrial Radio Access (E-UTRA); Physical layer procedures (Release 9), Sep. 2010, 80 pages.
"Ex Parte Quayle Action", U.S. Appl. No. 13/625,976, Dec. 11, 2015, 11 pages.
"Ex Parte Quayle Action", U.S. Appl. No. 14/108,544, Apr. 23, 2015, 8 pages.
"Ex Parte Quayle Action", U.S. Appl. No. 14/451,950, Aug. 4, 2015, 7 pages.
"Final Office Action", U.S. Appl. No. 13/477,609, Jul. 31, 2015, 11 pages.
"Final Office Action", U.S. Appl. No. 13/625,976, Jun. 5, 2015, 40 pages.
"First Choice Power", http://www.firstchoicepower.com/plans-services/electricity-plans/variable-rate-electricity-plans.aspx—Retrieved on May 18, 2012, 1 page.
"How Does Prepaid Electricity Work", http://www.mxenergy.com/does-prepaid-electricity-work-a-19.html—Retrieved on Jan. 15, 2012, 3 pages.
"International Preliminary Report on Patentability", Application No. PCT/US2013/054623, Apr. 9, 2015, 12 pages.
"International Preliminary Report on Patentability", Application No. PCT/US2013/060170, Mar. 24, 2015, 6 pages.
"International Preliminary Report on Patentability", Application No. PCT/US2013/042042, Mar. 10, 2015, 8 pages.
"International Search Report and Written Opinion", Application No. PCT/US2014/070384, Mar. 13, 2015, 12 pages.
"International Search Report and Written Opinion", Application No. PCT/US2013/054623, May 14, 2014, 14 pages.
"International Search Report and Written Opinion", Application No. PCT/US2013/040242, Oct. 4, 2013, 14 pages.
"International Search Report and Written Opinion", Application No. PCT/US2014/018479, Jul. 22, 2014, 17 pages.
"International Search Report and Written Opinion", Application No. PCT/US2013/060170, Dec. 5, 2013, 8 pages.
"Non-Final Office Action", U.S. Appl. No. 13/477,609, Dec. 3, 2014, 7 pages.
"Non-Final Office Action", U.S. Appl. No. 13/477,609, Dec. 14, 2015, 9 pages.
"Non-Final Office Action", U.S. Appl. No. 13/621,857, Nov. 14, 2014, 5 pages.
"Non-Final Office Action", U.S. Appl. No. 13/625,976, Feb. 5, 2015, 38 pages.
"Non-Final Office Action", U.S. Appl. No. 14/457,190, Sep. 18, 2015, 25 pages.
"Notice of Allowance", U.S. Appl. No. 13/621,857, Jan. 26, 2015, 7 pages.
"Notice of Allowance", U.S. Appl. No. 13/621,857, May 11, 2015, 5 pages.
"Notice of Allowance", U.S. Appl. No. 14/108,544, Oct. 15, 2015, 6 pages.
"Notice of Allowance", U.S. Appl. No. 14/451,950, Jan. 15, 2016, 5 pages.
"Restriction Requirement", U.S. Appl. No. 13/621,857, Aug. 18, 2014, 7 pages.
"Supplemental Notice of Allowance", U.S. Appl. No. 14/451,950, Jan. 29, 2016, 2 pages.
"Your Choice Your Plan", GreyStone Power Corporation, http://www.greystonepower.com/UploadedFiles/pdf/prepaid%20brochure.pdf—Retrieved on Jun. 4, 2012, 2 pages.
Park,"Energy Maps for Large-scale, Mobile Wireless Networks", IEEE International Conference on Communications, 2007, Jun. 24, 2007, 6 pages.
"Corrected Notice of Allowance", U.S. Appl. No. 13/625,976, May 4, 2016, 2 pages.
"Final Office Action", U.S. Appl. No. 14/457,190, Mar. 3, 2016, 33 pages.
"Non-Final Office Action", U.S. Appl. No. 14/293,182, May 20, 2016, 10 pages.
"Notice of Allowance", U.S. Appl. No. 13/477,609, Apr. 11, 2016, 5 pages.
"Notice of Allowance", U.S. Appl. No. 13/625,976, Mar. 3, 2016, 8 pages.
"Notice of Allowance", U.S. Appl. No. 14/451,950, Apr. 22, 2016, 5 pages.
"Supplemental Notice of Allowance", U.S. Appl. No. 13/625,976, Mar. 24, 2016, 5 pages.
Corrected Notice of Allowance, U.S. Appl. No. 14/479,679, Aug. 3, 2016, 2 pages.
Notice of Allowance, U.S. Appl. No. 14/479,679, Jun. 21, 2016, 9 pages.
Supplemental Notice of Allowance, U.S. Appl. No. 13/477,609, Jun. 16, 2016, 2 pages.
Supplemental Notice of Allowance, U.S. Appl. No. 14/451,950, Jun. 10, 2016, 2 pages.
Supplemental Notice of Allowance, U.S. Appl. No. 14/451,950, Aug. 3, 2016, 2 pages.

\* cited by examiner

REDUCED-POWER TRANSMITTING FROM A COMMUNICATIONS DEVICE

CROSS-REFERENCE TO RELATED APPLICATIONS

The present application is related to U.S. patent application PCT/US2014/014981, filed on an even date herewith.

TECHNICAL FIELD

The present disclosure is related generally to electronic communications and, more particularly, to transmitting radio-frequency energy.

BACKGROUND

When they transmit, electronic devices necessarily produce and emit electromagnetic energy. If a device is near enough to a human being when it transmits (consider, for example, a cellular telephone), then some of that emitted energy can be absorbed by the human being.

Numerous health studies have failed to show any adverse health effects associated with the electromagnetic energy emitted by cellular telephones. However, some people are not convinced by these studies. The Federal Communications Commission ("FCC") of the United States government sets precautionary standards that limit the amount of energy absorbable by a human being that a device can emit. These are the so-called Specific Absorption Rate ("SAR") standards.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

Figure 1:
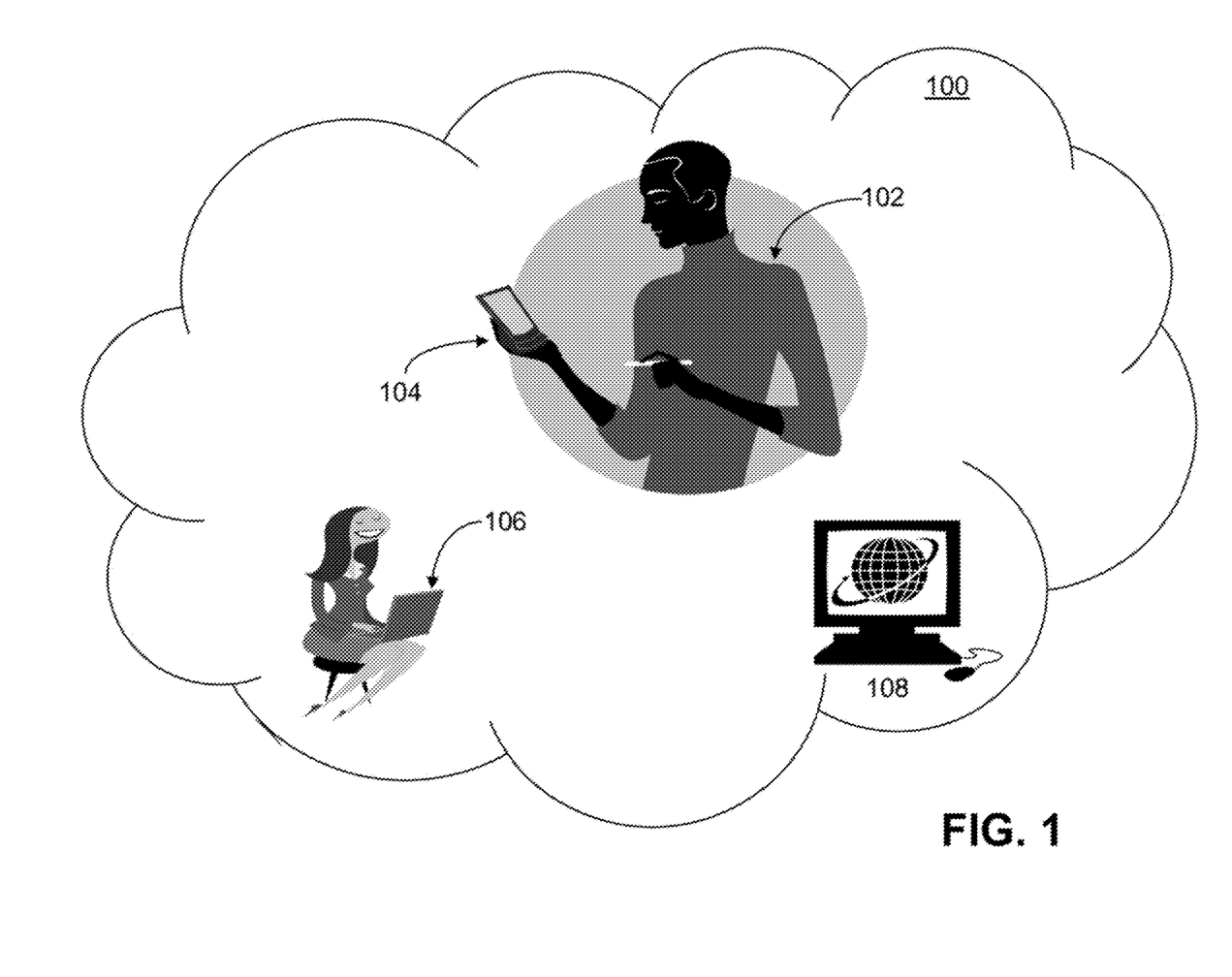
FIG. 1 is an overview of a representative environment in which the present techniques may be practiced.

Communication devices such as cellular telephones, while originally designed to carry voice calls, are now capable of much more. Consider the communications environment 100 of FIG. 1. Here, a user 102 communicates via his personal communications device 104 (e.g., a cellular phone or tablet computer) to, for example, call a friend or access a web site 108. While performing these communications tasks, the device 104 emits RF energy. Further RF energy may be emitted if the device 104 acts as an intermediary. If, for example, the laptop computer 106 supports a short-range radio protocol, such as WiFi, but does not support cellular data, then the device 104 may support the device 106 by communicating over WiFi with the device 106 while simultaneously routing traffic from the device 106 over a cellular packet data link to the web site 108. In this case, the device 104 is seen to simultaneously support several different radio links and is emitting RF energy in support of each link. These and other communications tasks can increase the amount of RF energy emitted by the device 104 and can potentially increase the amount of RF energy to which the user 102 is exposed.

In another ongoing development, the FCC may change its SAR emission standards to be even more strict than they are currently.

Aspects of the present disclosure address these issues by decreasing, in a time-averaged regime, the amount of RF energy emitted by a communications device 104. Generally speaking, the network (also called the "source") tells the communications device 104 what power level it should transmit at. If, however, the device 104 determines that it would exceed an emission standard by transmitting at the specified power level for as long as it needs to in order to carry out its transmission duties, then the device 104 can instead decide to transmit at a lower power level. Alternatively (or in combination), the device 104 can, instead of transmitting all the time while it has data to send, only transmit intermittently. In either case, the emitted electromagnetic energy, as averaged over a period of time, is reduced below the maximum allowed by the standard. Later, if possible and necessary, the device 104 can again transmit at a higher power level or more frequently.

Figure 2:
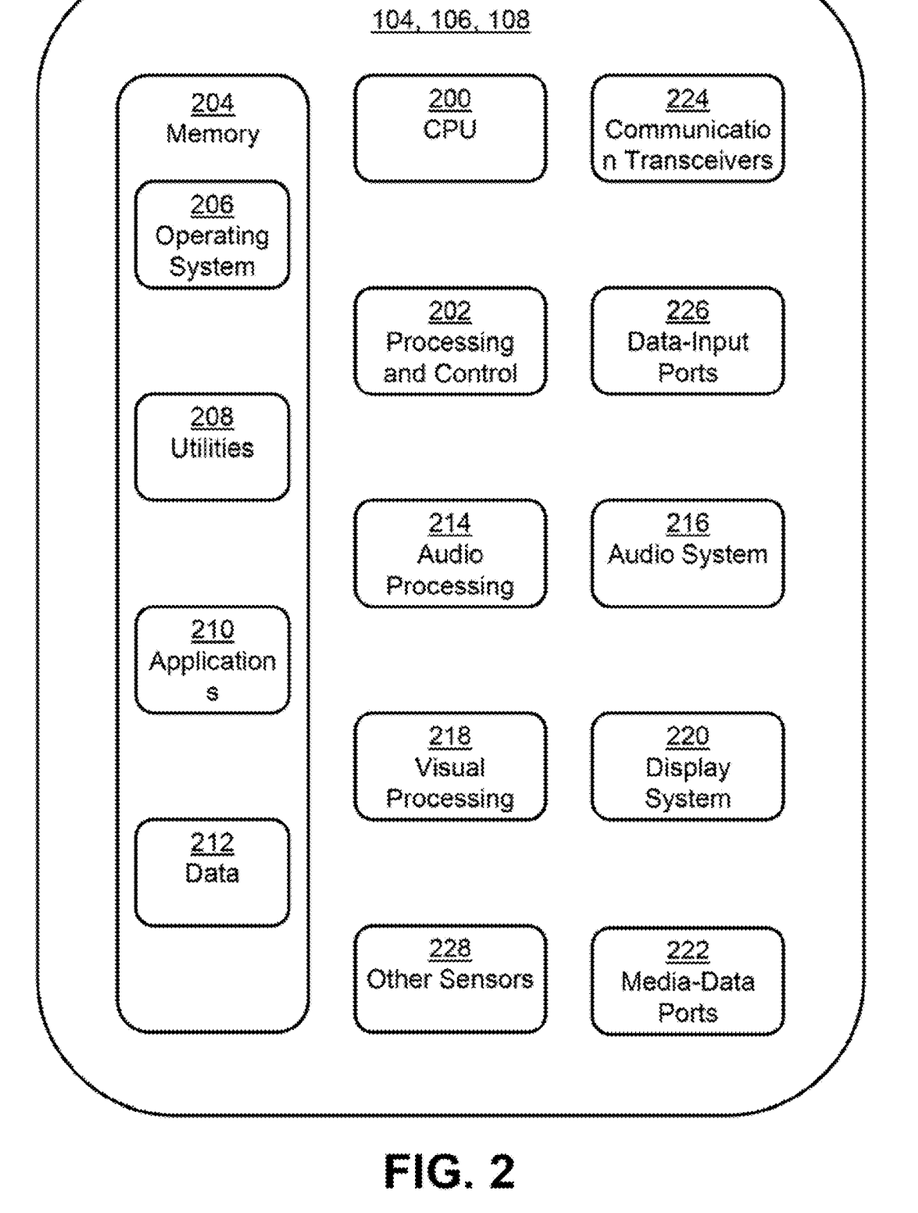
FIG. 2 is a generalized schematic of some of the devices of FIG. 1.

FIG. 2 shows the major components of a representative electronics device 104, 106, 108. A portable communications device 104, 106 could be, for example, a smartphone, tablet, personal computer, electronic book, or gaming controller. The server 108 could be any of these and could also be a set-top box, a compute server, or a coordinated group of compute servers.

Figure 3:
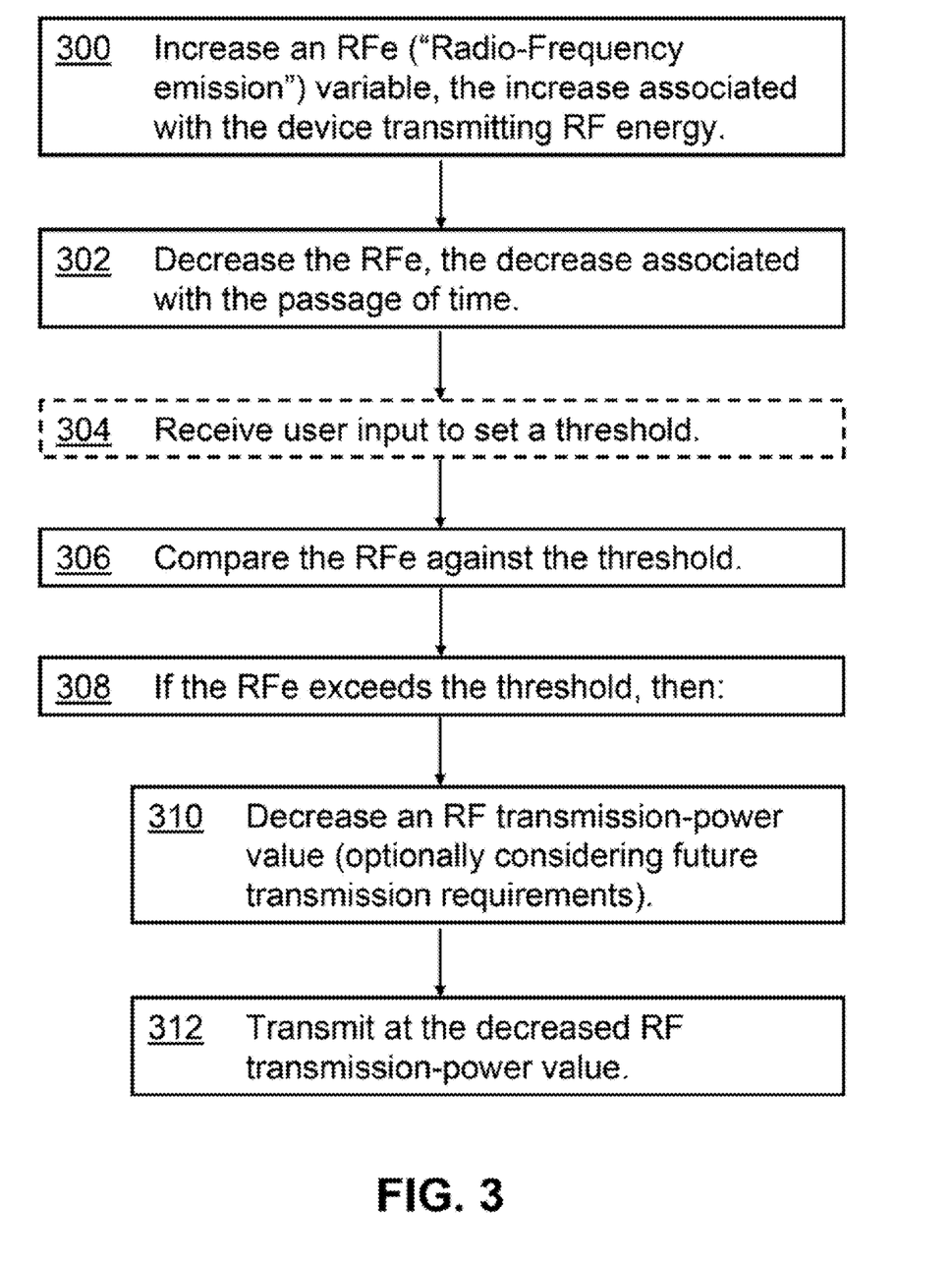
FIG. 3 is a flowchart of a representative method for decreasing transmit power.
Figure 5:
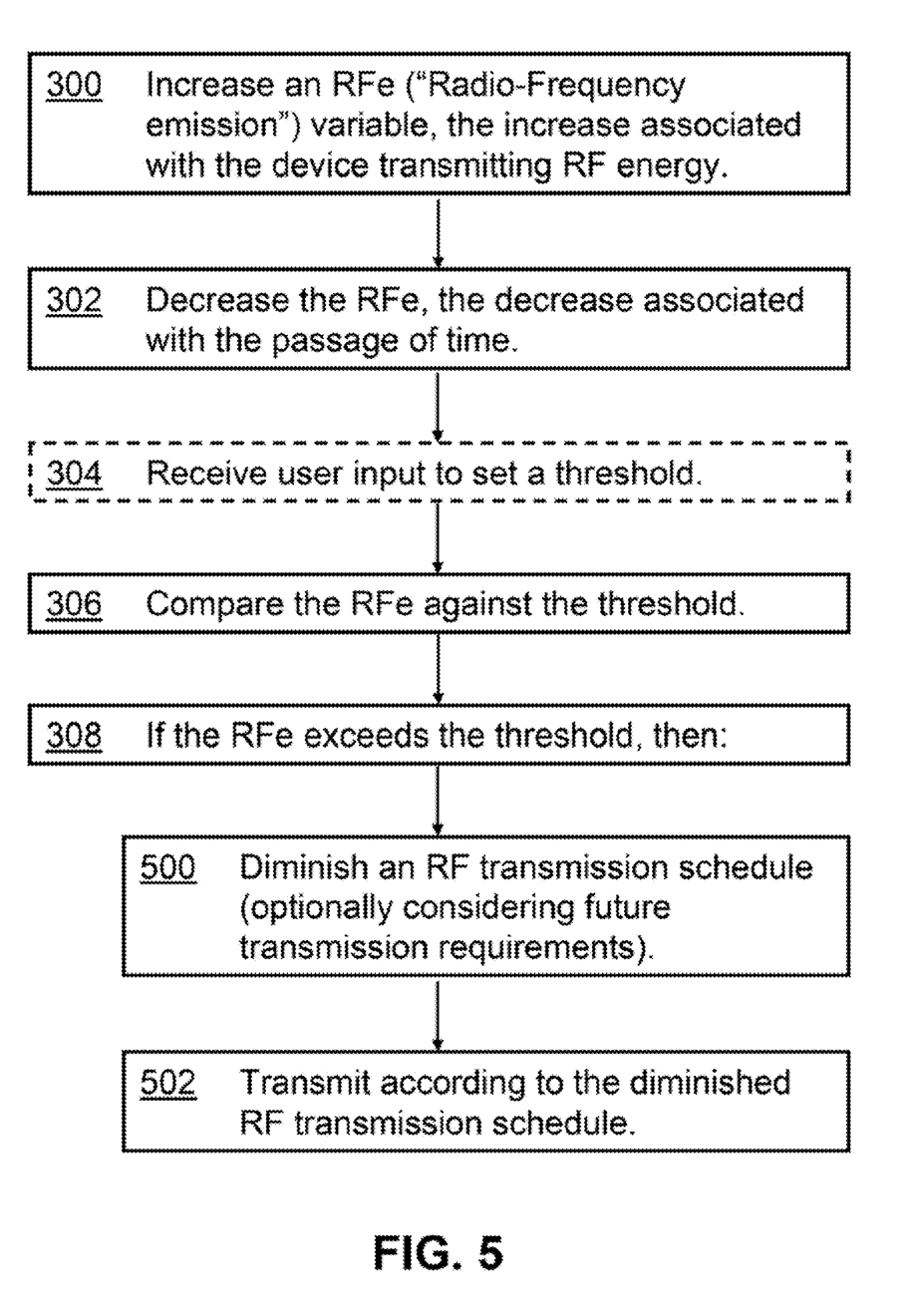
FIG. 5 is a flowchart of a representative method for diminishing a transmission schedule.

The CPU 200 of the electronics device 104, 106, 108 includes one or more processors (i.e., any of microprocessors, controllers, and the like) or a processor and memory system which processes computer-executable instructions to control the operation of the device 104, 106, 108. In particular, the CPU 200 supports aspects of the present disclosure as illustrated in FIGS. 3 and 5, discussed below. The device 104, 106, 108 can be implemented with a combination of software, hardware, firmware, and fixed-logic circuitry implemented in connection with processing and control circuits, generally identified at 202. Although not shown, the device 104, 106, 108 can include a system bus or data-transfer system that couples the various components within the device 104, 106, 108. A system bus can include any combination of different bus structures, such as a memory bus or memory controller, a peripheral bus, a universal serial bus, and a processor or local bus that utilizes any of a variety of bus architectures.

The electronics device 104, 106, 108 also includes one or more memory devices 204 that enable data storage, examples of which include random-access memory, non-volatile memory (e.g., read-only memory, flash memory, EPROM, and EEPROM), and a disk storage device. A disk storage device may be implemented as any type of magnetic or optical storage device, such as a hard disk drive, a solid-state drive, a recordable or rewriteable disc, any type of a digital versatile disc, and the like. The device 104, 106, 108 may also include a mass-storage media device.

The memory system 204 provides data-storage mechanisms to store device data 212, other types of information and data, and various device applications 210. An operating system 206 can be maintained as software instructions within the memory 204 and executed by the CPU 200. The device applications 210 may also include a device manager, such as any form of a control application or software application. The utilities 208 may include a signal-processing and control module, code that is native to a particular component of the electronics device 104, 106, 108, a hardware-abstraction layer for a particular component, and so on.

The electronics device 104, 106, 108 can also include an audio-processing system 214 that processes audio data and controls an audio system 216 (which may include, for example, speakers). A visual-processing system 218 processes graphics commands and visual data and controls a display system 220 that can include, for example, a display screen. The audio system 216 and the display system 220 may include any devices that process, display, or otherwise render audio, video, display, or image data. Display data and audio signals can be communicated to an audio component or to a display component via a radio-frequency link, S-video link, High-Definition Multimedia Interface, composite-video link, component-video link, Digital Video Interface, analog audio connection, or other similar communication link, represented by the media-data ports 222. In some implementations, the audio system 216 and the display system 220 are components external to the device 104, 106, 108. Alternatively (e.g., in a cellular telephone), these systems 216, 220 are integrated components of the device 104, 106, 108.

The electronics device 104, 106, 108 can include a communications interface which includes communication transceivers 224 that enable wired or wireless communication. Example transceivers 224 include Wireless Personal Area Network radios compliant with various IEEE 802.15 standards, Wireless Local Area Network radios compliant with any of the various IEEE 802.11 standards, Wireless Wide Area Network cellular radios, Wireless Metropolitan Area Network radios compliant with various IEEE 802.16 standards, and wired Local Area Network Ethernet transceivers.

The electronics device 104, 106, 108 may also include one or more data-input ports 226 via which any type of data, media content, or inputs can be received, such as user-selectable inputs (e.g., from a keyboard, from a touch-sensitive input screen, or from another user-input device), messages, music, television content, recorded video content, and any other type of audio, video, or image data received from any content or data source. The data-input ports 226 may include USB ports, coaxial-cable ports, and other serial or parallel connectors (including internal connectors) for flash memory, storage disks, and the like. These data-input ports 226 may be used to couple the device 104, 106, 108 to components, peripherals, or accessories such as microphones and cameras.

Finally, the electronics device 104, 106, 108 may include any number of "other sensors" 228. These sensors 228 can include, for example, accelerometers, a GPS receiver, compass, barometer, magnetic-field sensor, and the like.

FIG. 3 presents a representative method for decreasing the amount of RF energy emitted by the device 104 (and consequently decreasing the amount of RF energy potentially absorbed by the user 102). In this method, an "RFe" variable is set up that tracks emitted RF energy, even if only approximately or by "proxy." In step 300, the RFe is increased whenever the device 104 transmits and thus emits RF energy. The amount of the increase is related to the amount of the energy transmitted. Because many devices 104 cannot actually measure their RF energy output, they instead base the RFe increase on their RF transmission-power level and on how long they transmit at that level. (This is a simplified integral of the RF transmission-power level over time.)

Step 302 decreases the RFe as time passes. Steps 300 and 302 reflect the processing of the RFe variable as a "leaky bucket." Together, these steps 300, 302 set the RFe so that it reflects the total amount of RF energy emitted over a set period of time. For example, the SAR standard allows measurements to be averaged over a period of thirty minutes (for the FCC's so-called "uncontrolled" environment), so the RFe can be implemented to reflect the amount of RF energy emitted by the device 104 over the past thirty minutes. (For the FCC SAR's "controlled" environment and for some European SAR requirements, the period is six minutes.)

It is possible to continuously update the RFe. In more realistic embodiments, however, the RFe increase (step 300) is only performed when the device 104 transmits, while the RFe decrease (step 302) is only performed just before the RFe is used for step 306.

The accumulated RFe is compared against a threshold in step 306. (Optional step 304 is discussed below.) This threshold can be based, at least in part, on the SAR standard for the allowable amount of RF energy absorbed in a time-averaged window. Again, it should be noted that a typical device 104 actually uses the combination of the RF transmission-power level and the amount of time transmitting as a proxy for the RF energy absorbed. Laboratory testing of actual RF energy absorption during transmission can set conversion values, making this proxy calculation a sound one.

To be extra conservative, the threshold used in step 306 may be purposefully set somewhat below the maximum allowable by the SAR standard.

Other information, when available, can affect the threshold. Some devices 104 incorporate mechanisms (such as infrared sensors and generally part of the "other sensors" 228 of FIG. 2) that can determine whether the user 102 is closely proximate to the device 104. Because RF energy is highly dependent upon the distance between the emitting device 104 and the potential absorber 102, the threshold can be decreased if the user 102 is found to be very close to the device 104. Of course, this means that the threshold can vary constantly as the proximity changes. (Mathematically, it does not matter whether the threshold is decreased here or whether the RFe is increased even more in step 300. All such mathematical equivalencies are contemplated and are considered to be covered by the claims.)

Returning to step 304, some users 102 may be more concerned about RF energy absorption than others (even though, as discussed above, no reliable studies have shown any adverse health affects due to RF energy absorption, at the rates generated by cellular devices 104). Step 304 allows these users 102 to choose a "lower emissions" mode of operation for their device 104. This somewhat reduces the threshold used in step 306 and thus reduces the maximum capacity of the leaky bucket whose current fill level is measured by the RFe variable. The tradeoff for a reduced threshold is somewhat reduced throughput and possibly other noticeable call-quality issues.

If the accumulated RFe exceeds the threshold (step 308), then the RF transmission-power value is decreased in step 310. As a refinement in step 310, some embodiments predict future transmission requirements (possibly based on the amount of data to be sent soon as reflected in the amount of data currently in the transmit buffers, and possibly requiring the use of multiple RF protocols, e.g., simultaneously transmitting WiFi and cellular packet data) and base the amount of the decrease on these future requirements. In some situations, a good prediction leading to a greater decrease in power right now could avoid the necessity of drastically cutting power later.

Figure 4:
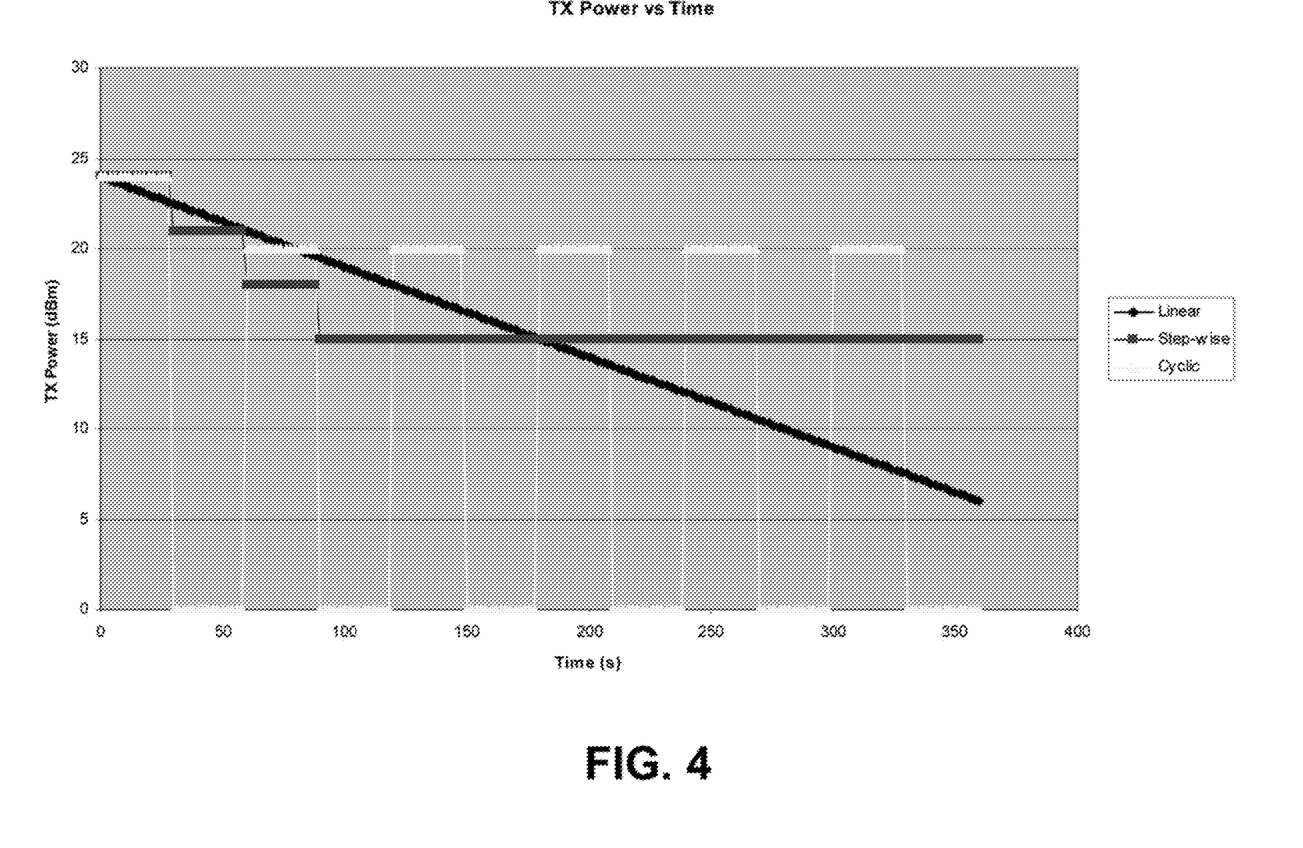
FIG. 4 is a chart of a few representative transmit-power curves according to the teachings of the present disclosure.

There are many ways to decrease the RF transmission-power value, and FIG. 4 illustrates a few of them. The linear method shows the power value decreasing steadily over time, while the stepwise method takes the value down in discrete steps as needed (e.g., the size of the steps can be based on how much the RFe exceeds the threshold at any given time). The cyclic method tries to compromise while reducing the accumulation of RF energy transmitted by quickly alternating between periods of transmission at a relatively high power value (good for getting the data across without error) and periods of not transmitting at all (good for allowing the RFe to decrease over time).

In step 312, the device 104 transmits at the decreased RF transmission-power value. In consequence, the RFe increase (step 300) based on the transmission of step 312 is somewhat less than it would have been otherwise.

Note that, in some cases, the RF transmission-power level is set by a network commanding the device 104 to transmit at a given power level. In these cases, the device 104 "bends the rule" set down by the network by transmitting at the decreased RF transmission-power value.

There are many ways to perform the calculations of the method of FIG. 3. The following presents one representative method that uses the following definitions:

$\hat{P}$ maximum RF transmission-power setting of the device 104

$\hat{SAR}$ maximum (1 g or 10 g) SAR corresponding to the maximum transmission-power setting of the device 104

$SAR_L$ applicable (1 g or 10 g) SAR limit

T allowable SAR-averaging time-interval $\Delta$ time-interval at which the next allowable power setting is established (not smaller than the minimum interval between successive RF transmission-power adjustments)

$t_h$ generic (h-th) time when a power adjustment is made: $t_h = h \cdot \Delta$ $P_h$ RF transmission power setting during the interval $[t_{h-1}, t_h)$ N nearest integer not greater than $T/\Delta$: $N = \lfloor T/\Delta \rfloor$ Assume that $\hat{SAR} > SAR_L$ in an intended-use test configuration. For the SAR to be compliant at any time t, the following condition should be met:

$$\frac{1}{T}\int_{t-T}^{t} SAR(\tau)d\tau \le SAR_L \Rightarrow \frac{1}{T}\int_{t-T}^{t} P(\tau)d\tau \le \hat{P} \cdot \left(\frac{SAR_L}{\hat{SAR}}\right) = P_L$$

where $SAR(\tau)$ is the instantaneous (1 g or 10 g) SAR corresponding to the instantaneous RF transmission power $P(\tau)$. SAR and RF transmission power are proportional.

At $t = t_h$ the SAR is compliant if:

$$\frac{1}{N+1}\sum_{k=0}^{N-1} P_{h-k} + \frac{\hat{P}}{N+1} \le P_L \Rightarrow$$

$$\sum_{k=0}^{N-1} P_{h-k} + \hat{P} \le (N+1)P_L \Rightarrow \sum_{k=0}^{N-1} P_{h-k} \le (N+1)P_L - \hat{P} = W$$

This is purposely made slightly conservative by assuming that $P_{h-N} = \hat{P}$, i.e., that the RF transmission-power setting during the prior (N+1)-th interval is equal to the maximum power of the device 104.

Question: Assuming that the SAR is compliant at $t = t_h$, what is the maximum value allowable for the RF transmission power ($P_{h+1}$) at the next adjustment ($t = t_{h+1}$)? The answer is:

$$\sum_{k=0}^{N-1} P_{h+1-k} =$$

$$P_{h+1} + \sum_{k=1}^{N-1} P_{h+1-k} \le W \Rightarrow P_{h+1} \le \max\left\{0, W - \sum_{k=1}^{N-1} P_{h+1-k}\right\} = M_{h+1}.$$

Thus the RF transmission power will be set to no more than $M_{h+1}$ at the next adjustment. So if the network is requesting the device 104 to set its RF transmission-power level at $P_{h+1}^{req}$, the actual power setting will be:

$P_{h+1} \le \min\{P_{h+1}^{req}, M_{h+1}\}$.

Observe that:

$M_{h+1} = W - \Sigma_{h+1}$ where:

$$\sum_{h+1} = \sum_{k=1}^{N-1} P_{h+1-k} = P_h + \sum_{k=2}^{N-1} P_{h+1-k} =$$

$$\underbrace{P_h + \sum_{k=1}^{N-2} P_{h-k} + P_{h-(N-1)} - P_{h-(N-1)}}_{\sum_{k=1}^{N-1} P_{h-k} = \sum_h} = \sum_h + [P_h - P_{h-(N-1)}]$$

thus showing that the computation of successive $\Sigma_h$ coefficients (and the corresponding $M_h$ power thresholds) can be done efficiently (two sums) without requiring the summation of N−1 terms at each iteration, which could be computationally cumbersome for a mobile processor especially when performed at every signal frame (e.g., 217 times per second for GSM, corresponding to about N=390,600 summation terms for T=thirty minutes).

This approach is very aggressive, in the sense that it forces the device 104 to transmit at the power level dictated by the network at all times until the "SAR allowance" is depleted ($M_{h+1}$ vanishes). At that point the device 104 stops transmitting (any call is dropped) and resumes only when $M_{h+1}$ becomes positive again.

On the pro side, such an approach does not produce any impact on the call quality (e.g., data rates) up to and until the "SAR allowance" is depleted. On the con side, it produces an abrupt termination of the call once $M_{h+1} = 0$ (or below the lowest available power setting of the device 104).

Therefore, ancillary approaches could reduce the likelihood of dropped calls. For instance, it could be established that the power setting always be one "notch" (e.g., 2 dB) below what is currently requested by the system once the SAR allowance is, say, 50% depleted, then two notches when it is 75% depleted, and so on.

The "SAR depletion factor" can be defined as:

$$\alpha = \frac{\frac{1}{T}\int_{t-T}^{t} SAR(\tau)d\tau}{SAR_L} = \frac{\frac{1}{T}\int_{t-T}^{t} P(\tau)d\tau}{P_L}$$

which can be implemented in a computationally efficient fashion as:

$$\alpha_{h+1} = \frac{\frac{1}{N}\sum_{k=0}^{N-1} P_{h-k}}{P_L} = \frac{\frac{1}{N}\left(P_h + \sum_{k=1}^{N-1} P_{h-k}\right)}{P_L} = \frac{P_h + \sum_{h}}{N \cdot P_L}.$$

The SAR depletion factor is used to "notch-down" the RF transmission power as long as $M_{h+1} > \hat{P}$, otherwise the power level would be reduced unnecessarily. This criterion can be changed to $M_{h+1} > P_{h+1}^{req}$ to reduce the likelihood of abrupt dropped calls. However, in this case the transmit power would stay lower than the level that would be allowed by the former ($M_{h+1} > \hat{P}$) condition. Therefore, the choice of one of the two options may depend on the type of call, for instance the former option might be more suitable for a voice call.

FIG. 5 presents another representative method for decreasing the amount of RF energy emitted by the device 104. It may be used as an alternative to, or in conjunction with, the method of FIG. 3. The first steps, 300 through 308, can be the same as described above for FIG. 3. That is, the RFe is calculated and compared against a threshold.

If the RFe exceeds the threshold (step 308), then instead of (or in addition to) reducing the RF transmission power (see the discussion of step 310 of FIG. 3 above), the RF transmission schedule is diminished (step 500). That is, even if there are sufficient data waiting to be sent to justify sending in every available timeslot, transmission will be scheduled only for some of the timeslots. During the other timeslots, the device 104 does not transmit, thus allowing the leaky bucket RFe to decrease.

Figure 6:
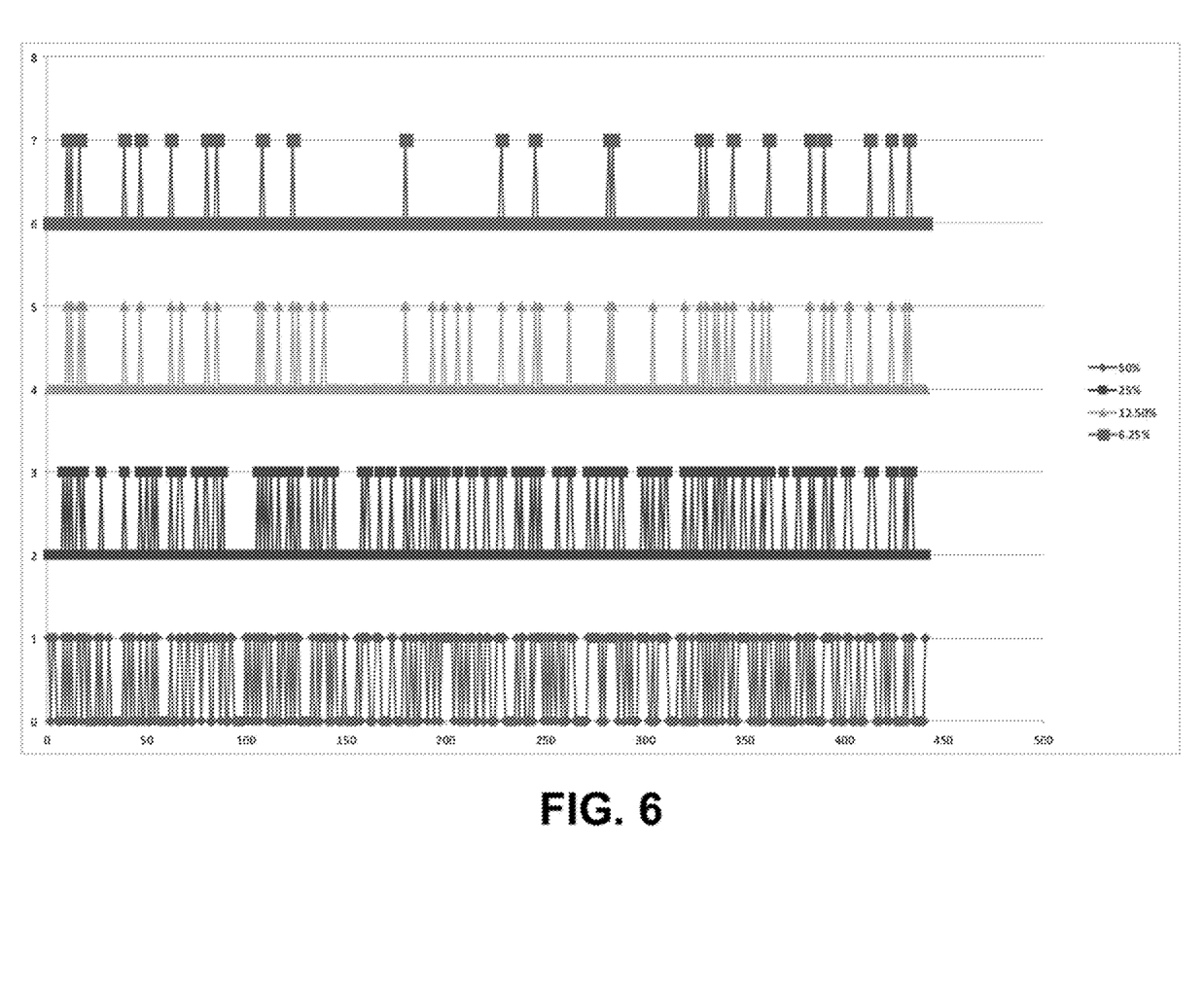
FIG. 6 is a chart of a few representative diminished transmission schedules according to the teachings of the present disclosure.

As there are many ways to decrease the RF transmission power (see FIG. 4 and the accompanying discussion), there are many ways to diminish the transmission schedule. In some cases, the schedule is decreased deterministically. Thus, for example, transmission is scheduled for only every other timeslot, or every third timeslot, etc. In other cases, the scheduling can be random, as illustrated by the transmission schedules of FIG. 6. In the bottom line of FIG. 6, transmissions are randomly scheduled for 50% of the timeslots. In the top line, the percentage of scheduled timeslots is dropped to only 6.25%. As with reducing RF transmission power, the actual amount of diminishing of the transmission schedule can depend on many factors such as the amount that the RFe exceeds the threshold, predicted future transmission requirements, and the like.

In step 502, data are transmitted according to the diminished schedule. One way to accomplish this is to withhold data from the transmitting modem until the diminished schedule allows further transmission. Other techniques may be appropriate for other devices 104, depending upon specifics of their implementation.

In view of the many possible embodiments to which the principles of the present discussion may be applied, it should be recognized that the embodiments described herein with respect to the drawing figures are meant to be illustrative only and should not be taken as limiting the scope of the claims Therefore, the techniques as described herein contemplate all such embodiments as may come within the scope of the following claims and equivalents thereof.

We claim:

1. A method for transmitting from a communications device, the method comprising:
   determining, by the communications device, a specific absorption rate (SAR) allowance comprising an amount of radio frequency (RF) energy that is allowed to be received by a user of the communications device within a time frame;
   calculating, by the communications device, a current amount of RF energy (RFe) received by the user, the RFe comprising an integral of transmission power level over a time;
   calculating, by the communications device, a percentage of the SAR allowance that the RFe comprises;
   responsive to the percentage being above a first threshold that is less than the SAR allowance:
      determining a first diminished transmission power level, by the communications device, based on the first threshold; and
      transmitting, by the communications device, at the first diminished transmission power level; and
   responsive to the percentage being above a second threshold that is less than the SAR allowance but greater than the first threshold:
      determining, by the communications device, a second diminished transmission power level that is less than the first diminished transmission power level based on the second threshold; and
      transmitting, by the communications device, at the second diminished transmission power.

2. The method of claim 1, wherein the communications device receives, from a network to which the communications device will be transmitting, an RF transmission power level at which to initially transmit RF energy to the network.

3. The method of claim 2, wherein the first and second diminished transmission power levels are further based on the RF transmission power received by the network.

4. The method of claim 1, wherein the first and second diminished transmission power levels are further based on a transmission schedule, the transmission schedule defining the diminished transmission power level for a plurality of percentages.

5. The method of claim 1, wherein the first threshold is 50% of the SAR allowance.

6. The method of claim 1, wherein the transmission power level is zero when the device is not transmitting, the zero value is effective to lower the time averaged transmission power level for the RFe calculation.

7. The method of claim 1, wherein the transmission power level is a function of a distance between the device and the user.

8. The method of claim 1, wherein the first and second diminished transmission power levels are random.

9. The method of claim 1, further comprising withholding data to transmit until the percentage drops below an allowable level.

10. The method of claim 1, wherein the SAR allowance is determined based upon input from the user.

11. The method of claim 1 further comprising:
predicting future transmission requirements, and
wherein the first and second diminished transmission power levels are further based on the predicted future transmission requirements.

12. A communications device, the communications device comprising:
one or more processors;
a communications interface;
one or more computer-readable storage media comprising instructions that, when executed by the one or more processors, cause the communications device to perform operations comprising:
determining a specific absorption rate (SAR) allowance comprising an amount of radio frequency (RF) energy that is allowed to be received by a user of the communications device within a time frame;
calculating a current amount of RF energy (RFe) received by the user, the RFe comprising an integral of transmission power level over a time;
calculating a percentage of the SAR allowance that the RFe comprises;
responsive to the percentage being above a first threshold that is less than the SAR allowance:
determining a first diminished transmission power level based on the first threshold; and
transmitting at the first diminished transmission power level via the communications interface; and
responsive to the percentage being above a second threshold that is less than the SAR allowance but greater than the first threshold:
determining a second diminished transmission power level that is less than the first diminished transmission power based on the second threshold; and
transmitting at the second diminished transmission power level.

13. The communications device of claim 12, wherein operations further comprise delaying a transmission of data until the percentage drops below an allowable level.

14. The communications device of claim 12, wherein the operations further comprise receiving, from a network to which the communications device will be transmitting, an RF transmission power level value at which to initially transmit RF energy to the network and the first and second diminished transmission power levels are further based on the RF transmission power level value received by the network.

15. The communications device of claim 12, wherein the first and second diminished transmission power levels are further based on a transmission schedule, the transmission schedule defining other diminished transmission power levels for a plurality of other thresholds.

16. The communications device of claim 12, wherein the transmission power level is a function of a distance between the device and the user.

17. One or more non-transitory computer-readable storage media comprising instructions, that, when executed by one or more processors, reduce an amount of radio frequency (RF) energy absorbed by a user of a communications device by:
calculating a percentage of a specific absorption rate (SAR) allowance that a current amount of RF energy (RFe) received by the user comprises, the SAR allowance comprising an amount of radio frequency (RF) energy that is allowed to be received by the user of the communications device within a time frame, the RFe comprising a an integral of transmission power level for a time;
responsive to the percentage being above a first threshold that is less than the SAR allowance, transmitting at a first diminished transmission power level determined by the first threshold effective to lower the RFe; and
responsive to the percentage being above a second threshold that is higher than the first threshold but less than the SAR allowance, transmitting at a second diminished transmission power level determined by the second threshold effective to further lower the RFe.

18. The computer-readable storage media of claim 17, wherein the first and second diminished transmission power levels are determined according to a transmission power level schedule, the transmission power level schedule defining the diminished transmission power level for a plurality of percentages between the threshold and the SAR allowance.

19. The computer-readable storage media of claim 17, wherein the first and second diminished transmission power levels are further determined based on an initial transmission power level received from a network to which the communications device will be transmitting.

20. The computer-readable storage media of claim 17, wherein the transmission power level is dependent on a distance between the user and the communications device.

\* \* \* \* \*

UNITED STATES PATENT AND TRADEMARK OFFICE
CERTIFICATE OF CORRECTION

PATENT NO.         : 9,491,706 B2  
APPLICATION NO.    : 13/798682  
DATED              : November 8, 2016  
INVENTOR(S)        : Dean E. Thorson et al.

Page 1 of 1

It is certified that error appears in the above-identified patent and that said Letters Patent is hereby corrected as shown below:

In the Claims  
Column 8, Line 41, after "transmission power" insert --level--  
Column 8, Line 48, after "transmission power" before "received by" insert --level--  
Column 9, Line 12, after "one or more" before "computer-readable" insert --non-transitory--  
Column 9, Line 37, after "transmission power" before "based on" insert --level--  
Column 9, Line 47, after "power level" before "at which" delete "value"  
Column 10, Line 2, after "power level" before "received by" delete "value"

Signed and Sealed this  
Twenty-first Day of February, 2017

Michelle K. Lee  
*Director of the United States Patent and Trademark Office*